(12) United States Patent
Harutyunyan et al.

(10) Patent No.: US 11,489,147 B2
(45) Date of Patent: Nov. 1, 2022

(54) METHOD FOR EMBEDDING A BATTERY TAB ATTACHMENT IN A SELF-STANDING ELECTRODE WITHOUT CURRENT COLLECTOR OR BINDER

(71) Applicant: HONDA MOTOR CO., LTD., Tokyo (JP)

(72) Inventors: Avetik Harutyunyan, Santa Clara, CA (US); Oleg Kuznetsov, San Jose, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/314,807

(22) Filed: May 7, 2021

(65) Prior Publication Data

US 2021/0265619 A1    Aug. 26, 2021

Related U.S. Application Data

(62) Division of application No. 16/123,872, filed on Sep. 6, 2018, now Pat. No. 11,121,358.

(Continued)

(51) Int. Cl.
| | |
|---|---|
| *H01M 4/133* | (2010.01) |
| *H01M 4/04* | (2006.01) |
| *H01M 4/74* | (2006.01) |
| *H01M 4/62* | (2006.01) |
| *H01M 4/72* | (2006.01) |

(Continued)

(52) U.S. Cl.
CPC ......... *H01M 4/133* (2013.01); *H01M 4/0402* (2013.01); *H01M 4/043* (2013.01); *H01M 4/0404* (2013.01); *H01M 4/13* (2013.01); *H01M 4/139* (2013.01); *H01M 4/583* (2013.01); *H01M 4/625* (2013.01); *H01M 4/661* (2013.01); *H01M 4/72* (2013.01); *H01M 4/74* (2013.01);

(Continued)

(58) Field of Classification Search
None
See application file for complete search history.

(56) References Cited

U.S. PATENT DOCUMENTS

| | | | |
|---|---|---|---|
| 3,513,034 A | 5/1970 | Fischbach et al. | |
| 3,772,084 A | 11/1973 | Scholle | |

(Continued)

FOREIGN PATENT DOCUMENTS

| | | |
|---|---|---|
| CN | 101801394 A | 8/2010 |
| CN | 102047488 A | 5/2011 |

(Continued)

OTHER PUBLICATIONS

Communication dated Mar. 22, 2022, from the Japanese Patent Office in counterpart application No. 2018-142355.

(Continued)

*Primary Examiner* — Christopher P Domone
(74) *Attorney, Agent, or Firm* — ArentFox Schiff LLP; Mark Duell

(57) ABSTRACT

The present disclosure is directed to methods and embedding battery tab attachment structures within composites of electrode active materials and carbon nanotubes, which lack binder and lack collector foils, and the resulting self-standing electrodes. Such methods and the resulting self-standing electrodes may facilitate the use of such composites in battery and power applications.

20 Claims, 3 Drawing Sheets

Related U.S. Application Data

(60) Provisional application No. 62/559,254, filed on Sep. 15, 2017.

(51) Int. Cl.

| | |
|---|---|
| *H01M 4/13* | (2010.01) |
| *H01M 4/139* | (2010.01) |
| *H01M 4/66* | (2006.01) |
| *H01M 4/75* | (2006.01) |
| *H01M 50/531* | (2021.01) |
| *H01M 4/583* | (2010.01) |
| *H01M 10/052* | (2010.01) |

(52) U.S. Cl.
CPC ........... *H01M 4/75* (2013.01); *H01M 50/531* (2021.01); *H01M 10/052* (2013.01)

(56) References Cited

U.S. PATENT DOCUMENTS

| | | |
|---|---|---|
| 5,985,175 A | 11/1999 | Fan et al. |
| 7,094,385 B2 | 8/2006 | Beguin et al. |
| 7,288,870 B2 | 10/2007 | Mitcham et al. |
| 7,348,101 B2 | 3/2008 | Gozdz et al. |
| 7,622,059 B2 | 11/2009 | Bordere et al. |
| 7,999,028 B2 | 8/2011 | Lin et al. |
| 8,083,905 B2 | 12/2011 | Choi et al. |
| 8,084,158 B2 | 12/2011 | Chu et al. |
| 8,293,204 B2 | 10/2012 | Khodadadi et al. |
| 8,435,676 B2 | 5/2013 | Zhamu et al. |
| 8,465,871 B2 | 6/2013 | Juzkow et al. |
| 8,628,747 B2 | 1/2014 | Zachariah et al. |
| 8,703,092 B2 | 4/2014 | Ziegler |
| 8,787,001 B2 | 7/2014 | Fleischer et al. |
| 8,825,178 B2 | 9/2014 | Feng et al. |
| 8,883,113 B2 | 11/2014 | Richter et al. |
| 8,974,960 B2 | 3/2015 | Manthiram et al. |
| 8,986,872 B2 | 3/2015 | Lev et al. |
| 9,034,421 B2 | 5/2015 | Mikhaylik et al. |
| 9,167,736 B2 | 10/2015 | Shah et al. |
| 9,396,829 B2 | 7/2016 | Mann et al. |
| 9,406,985 B2 | 8/2016 | Amaratunga et al. |
| 9,450,266 B2 | 9/2016 | Hosaka et al. |
| 9,502,734 B1 | 11/2016 | Lim et al. |
| 9,615,473 B2 | 4/2017 | Kim |
| 9,692,056 B1 | 6/2017 | Liu et al. |
| 9,711,763 B2 | 7/2017 | Sohn et al. |
| 9,782,082 B2 | 10/2017 | Gannon et al. |
| 9,786,872 B2 | 10/2017 | Suh et al. |
| 9,807,876 B2 | 10/2017 | Catchpole |
| 9,812,681 B2 | 11/2017 | Heo |
| 9,859,586 B2 | 1/2018 | Suh et al. |
| 9,887,644 B2 | 2/2018 | Kim et al. |
| 9,941,492 B2 | 4/2018 | Suh et al. |
| 9,972,868 B2 | 5/2018 | Choi et al. |
| 9,979,225 B2 | 5/2018 | Bernhard |
| 10,033,031 B2 | 7/2018 | Wang et al. |
| 10,090,556 B2 | 10/2018 | Rho et al. |
| 10,096,803 B2 | 10/2018 | Iseri et al. |
| 10,122,010 B2 | 11/2018 | Tajima et al. |
| 10,147,915 B2 | 12/2018 | Song et al. |
| 10,199,851 B2 | 2/2019 | Hiroki et al. |
| 10,217,971 B2 | 2/2019 | Takahashi et al. |
| 10,957,939 B2 | 3/2021 | Zhi et al. |
| 2003/0084847 A1 | 5/2003 | Wood et al. |
| 2003/0099883 A1 | 5/2003 | Ochoa et al. |
| 2004/0086783 A1 | 5/2004 | Fong et al. |
| 2004/0234445 A1 | 11/2004 | Serp et al. |
| 2005/0008778 A1 | 1/2005 | Utsugi et al. |
| 2005/0063891 A1 | 3/2005 | Shaffer et al. |
| 2005/0148887 A1 | 7/2005 | Reiter et al. |
| 2005/0209392 A1 | 9/2005 | Luo et al. |
| 2005/0221185 A1 | 10/2005 | Sakata et al. |
| 2006/0039849 A1 | 2/2006 | Resasco et al. |
| 2006/0078489 A1 | 4/2006 | Harutyunyan et al. |
| 2006/0116443 A1 | 6/2006 | Probst et al. |
| 2006/0151318 A1 | 7/2006 | Park et al. |
| 2006/0245996 A1 | 11/2006 | Xie et al. |
| 2007/0224106 A1 | 9/2007 | Sakakibara et al. |
| 2007/0274899 A1 | 11/2007 | Wolf et al. |
| 2008/0131351 A1 | 6/2008 | Wang et al. |
| 2008/0210550 A1 | 9/2008 | Walther et al. |
| 2008/0233402 A1 | 9/2008 | Carlson et al. |
| 2008/0258117 A1 | 10/2008 | Bara et al. |
| 2009/0117026 A1 | 5/2009 | Shimazu et al. |
| 2009/0142659 A1 | 6/2009 | Lai et al. |
| 2009/0208708 A1 | 8/2009 | Wei et al. |
| 2009/0226704 A1 | 9/2009 | Kauppinen et al. |
| 2009/0274609 A1 | 11/2009 | Harutyunyan et al. |
| 2009/0286675 A1 | 11/2009 | Wei et al. |
| 2010/0000441 A1 | 1/2010 | Jang et al. |
| 2010/0038602 A1 | 2/2010 | Plee |
| 2010/0112443 A1 | 5/2010 | Blomgren et al. |
| 2010/0140560 A1 | 6/2010 | Wang et al. |
| 2010/0178543 A1* | 7/2010 | Gruner .................. H01G 11/56 977/762 |
| 2010/0221606 A1 | 9/2010 | Nalamasu et al. |
| 2010/0276644 A1 | 11/2010 | Wolf et al. |
| 2010/0285352 A1 | 11/2010 | Juzkow et al. |
| 2010/0285358 A1 | 11/2010 | Cui et al. |
| 2011/0060162 A1 | 3/2011 | Tatsuhara et al. |
| 2011/0111279 A1 | 5/2011 | Smithyman et al. |
| 2011/0123429 A1 | 5/2011 | Bordere et al. |
| 2011/0150746 A1 | 6/2011 | Khodadadi et al. |
| 2011/0158892 A1 | 6/2011 | Yamaki |
| 2011/0171398 A1 | 7/2011 | Oladeji |
| 2011/0177393 A1 | 7/2011 | Park et al. |
| 2011/0281156 A1* | 11/2011 | Boren ............... H01M 10/0525 429/188 |
| 2011/0311874 A1 | 12/2011 | Zhou et al. |
| 2012/0105370 A1 | 5/2012 | Moore |
| 2012/0107683 A1 | 5/2012 | Kim et al. |
| 2012/0121986 A1 | 5/2012 | Balu et al. |
| 2012/0132861 A1 | 5/2012 | Tamamitsu et al. |
| 2012/0138148 A1 | 6/2012 | Harutyunyan |
| 2012/0141864 A1 | 6/2012 | Juzkow et al. |
| 2012/0149824 A1 | 6/2012 | Hocke et al. |
| 2012/0156034 A1 | 6/2012 | Sabannavar et al. |
| 2012/0177934 A1 | 7/2012 | Vogel et al. |
| 2012/0193602 A1 | 8/2012 | Lieber et al. |
| 2012/0219490 A1 | 8/2012 | Noda et al. |
| 2012/0241666 A1 | 9/2012 | Hong et al. |
| 2012/0282522 A1 | 11/2012 | Axelbaum et al. |
| 2012/0295161 A1 | 11/2012 | Wang et al. |
| 2012/0315539 A1 | 12/2012 | Lashmore et al. |
| 2012/0321911 A1 | 12/2012 | Watanabe et al. |
| 2013/0040229 A1 | 2/2013 | Grigorian et al. |
| 2013/0065125 A1 | 3/2013 | Sawaki et al. |
| 2013/0065130 A1 | 3/2013 | Ban et al. |
| 2013/0106026 A1 | 5/2013 | Wang et al. |
| 2013/0143077 A1 | 6/2013 | Yebka et al. |
| 2013/0149440 A1 | 6/2013 | Pyzik et al. |
| 2013/0171485 A1 | 7/2013 | Kodera et al. |
| 2013/0171496 A1 | 7/2013 | Wang et al. |
| 2013/0189565 A1 | 7/2013 | Lashmore et al. |
| 2013/0224551 A1 | 8/2013 | Hiralal et al. |
| 2013/0256011 A1 | 10/2013 | Chang et al. |
| 2013/0323583 A1 | 12/2013 | Phares |
| 2014/0005960 A1 | 1/2014 | Anderson et al. |
| 2014/0013588 A1* | 1/2014 | Wang ................ H01M 10/0525 29/623.2 |
| 2014/0021403 A1 | 1/2014 | Kim et al. |
| 2014/0057178 A1 | 2/2014 | He et al. |
| 2014/0065447 A1 | 3/2014 | Liu et al. |
| 2014/0141248 A1 | 5/2014 | Noyes |
| 2014/0170490 A1 | 6/2014 | Izuhara et al. |
| 2014/0178543 A1 | 6/2014 | Russell et al. |
| 2014/0255782 A1 | 9/2014 | Jabbour et al. |
| 2014/0287304 A1 | 9/2014 | Netz |
| 2014/0326181 A1 | 11/2014 | Kim |
| 2014/0370347 A1 | 12/2014 | Jung et al. |
| 2015/0010788 A1 | 1/2015 | Aria et al. |
| 2015/0037239 A1 | 2/2015 | Sue et al. |
| 2015/0044581 A1 | 2/2015 | Holme et al. |

(56) References Cited

U.S. PATENT DOCUMENTS

| | | |
|---|---|---|
| 2015/0059571 A1 | 3/2015 | Denton et al. |
| 2015/0064521 A1 | 3/2015 | Watanabe et al. |
| 2015/0087858 A1 | 3/2015 | Ci et al. |
| 2015/0133569 A1 | 5/2015 | Gong et al. |
| 2015/0188112 A1 | 7/2015 | Adre et al. |
| 2015/0200417 A1 | 7/2015 | Song et al. |
| 2015/0207143 A1* | 7/2015 | Wu ............... H01M 4/366 |
| | | 429/231.8 |
| 2015/0207168 A1 | 7/2015 | Do et al. |
| 2015/0233010 A1 | 8/2015 | Pan et al. |
| 2015/0236366 A1 | 8/2015 | Chang et al. |
| 2015/0243451 A1 | 8/2015 | Kim et al. |
| 2015/0243452 A1 | 8/2015 | Gruner et al. |
| 2015/0255828 A1 | 9/2015 | Momo et al. |
| 2015/0279578 A1 | 10/2015 | Martini et al. |
| 2015/0325820 A1 | 11/2015 | Sohn et al. |
| 2015/0333302 A1 | 11/2015 | Johns et al. |
| 2015/0340684 A1 | 11/2015 | Voillequin et al. |
| 2015/0340741 A1 | 11/2015 | Kim et al. |
| 2015/0349325 A1 | 12/2015 | Chen et al. |
| 2015/0364750 A1 | 12/2015 | Maheshwari et al. |
| 2015/0372344 A1 | 12/2015 | Iwasaki et al. |
| 2015/0380738 A1 | 12/2015 | Zhou et al. |
| 2016/0009557 A1 | 1/2016 | Harutyunyan et al. |
| 2016/0013457 A1 | 1/2016 | Suh et al. |
| 2016/0013458 A1 | 1/2016 | Suh et al. |
| 2016/0020437 A1 | 1/2016 | Sohn et al. |
| 2016/0023905 A1 | 1/2016 | Wei |
| 2016/0036059 A1 | 2/2016 | Tokune et al. |
| 2016/0040780 A1 | 2/2016 | Donahue |
| 2016/0049569 A1 | 2/2016 | Negrin |
| 2016/0079629 A1 | 3/2016 | Abe et al. |
| 2016/0082404 A1 | 3/2016 | Pigos |
| 2016/0094079 A1 | 3/2016 | Hiroki et al. |
| 2016/0126554 A1 | 5/2016 | Beneventi et al. |
| 2016/0149193 A1 | 5/2016 | Seong |
| 2016/0149253 A1 | 5/2016 | Yi et al. |
| 2016/0166837 A1 | 6/2016 | Strommer et al. |
| 2016/0329533 A1 | 11/2016 | Tajima |
| 2016/0365544 A1 | 12/2016 | Lee et al. |
| 2016/0372717 A1 | 12/2016 | Noda |
| 2017/0005504 A1 | 1/2017 | Rho et al. |
| 2017/0018799 A1 | 1/2017 | Jeong |
| 2017/0033326 A1 | 2/2017 | Goto et al. |
| 2017/0040582 A1 | 2/2017 | Kim |
| 2017/0155098 A1 | 6/2017 | Park et al. |
| 2017/0155099 A1 | 6/2017 | Song et al. |
| 2017/0214052 A1 | 7/2017 | Xu |
| 2017/0263972 A1 | 9/2017 | Rho et al. |
| 2017/0288255 A1 | 10/2017 | Kim et al. |
| 2017/0338439 A1 | 11/2017 | Yokoyama |
| 2017/0338449 A1 | 11/2017 | Rho et al. |
| 2017/0338489 A1 | 11/2017 | Miwa et al. |
| 2018/0026236 A1 | 1/2018 | Lee et al. |
| 2018/0062417 A1 | 3/2018 | Choi et al. |
| 2018/0115026 A1 | 4/2018 | Mairs |
| 2018/0240609 A1 | 8/2018 | Park et al. |
| 2018/0241081 A1 | 8/2018 | Deng et al. |
| 2018/0309117 A1 | 10/2018 | Zhu et al. |
| 2019/0027638 A1 | 1/2019 | Masuda et al. |
| 2019/0033602 A1 | 1/2019 | Lee et al. |
| 2019/0036103 A1 | 1/2019 | Pierce et al. |
| 2019/0088925 A1 | 3/2019 | Harutyunyan et al. |
| 2019/0099129 A1 | 4/2019 | Kopelman et al. |
| 2019/0115633 A1 | 4/2019 | Akihisa |
| 2019/0122464 A1 | 4/2019 | Delong et al. |
| 2019/0140270 A1 | 5/2019 | Wang et al. |
| 2019/0171315 A1 | 6/2019 | Park et al. |
| 2019/0237748 A1 | 8/2019 | Shin et al. |
| 2019/0393486 A1 | 12/2019 | He et al. |
| 2020/0264663 A1 | 8/2020 | Kumta et al. |
| 2021/0399289 A1 | 12/2021 | Eshraghi et al. |

FOREIGN PATENT DOCUMENTS

| | | |
|---|---|---|
| CN | 102482098 A | 5/2012 |
| CN | 102593436 A | 7/2012 |
| CN | 102674316 A | 9/2012 |
| CN | 102674316 B | 5/2014 |
| CN | 204072059 U | 1/2015 |
| CN | 104752651 A | 7/2015 |
| CN | 103219467 B | 11/2015 |
| CN | 103715394 B | 1/2016 |
| CN | 205375473 U | 7/2016 |
| CN | 103280846 B | 8/2016 |
| CN | 106024969 A | 10/2016 |
| CN | 205697720 U | 11/2016 |
| CN | 106299237 A | 1/2017 |
| CN | 104392845 B | 3/2017 |
| CN | 104362326 B | 8/2017 |
| CN | 107074534 A | 8/2017 |
| CN | 107086306 A | 8/2017 |
| CN | 107611340 A | 1/2018 |
| CN | 108878717 A | 11/2018 |
| CN | 109088071 A | 12/2018 |
| CN | 208690415 U | 4/2019 |
| CN | 106129536 B | 7/2019 |
| DE | 102017123752 B3 | 3/2019 |
| EP | 2 213 369 A1 | 8/2010 |
| EP | 2 476 648 A1 | 7/2012 |
| EP | 2 835 177 A1 | 2/2015 |
| JP | 6-267515 A | 9/1994 |
| JP | 11-31502 A | 2/1999 |
| JP | 11-87875 A | 3/1999 |
| JP | 2005-272277 A | 10/2005 |
| JP | 2007-49789 A | 2/2007 |
| JP | 2008-305608 A | 12/2008 |
| JP | 2010-277925 A | 12/2010 |
| JP | 2012-512956 A | 6/2012 |
| JP | 2015-105208 A | 6/2015 |
| JP | 2015-521347 A | 7/2015 |
| JP | 2015-220004 A | 12/2015 |
| JP | 2016-25077 A | 2/2016 |
| JP | 2016-31922 A | 3/2016 |
| JP | 2016-54113 A | 4/2016 |
| JP | 2016-73196 A | 5/2016 |
| JP | 2017-130274 A | 7/2017 |
| JP | 2017-147222 A | 8/2017 |
| JP | 2017-162637 A | 9/2017 |
| KR | 10-2007-0001220 A | 1/2007 |
| KR | 10-1548465 B1 | 8/2015 |
| KR | 10-2016-0047643 A | 5/2016 |
| KR | 10-1632109 B1 | 6/2016 |
| KR | 10-2016-0114389 A | 10/2016 |
| KR | 10-2016-0127641 A | 11/2016 |
| KR | 10-2016-0129440 A | 11/2016 |
| KR | 10-2016-0129500 A | 11/2016 |
| KR | 10-1676641 B1 | 11/2016 |
| KR | 10-1703516 B1 | 2/2017 |
| KR | 10-2017-0036478 A | 4/2017 |
| KR | 10-2017-0037510 A | 4/2017 |
| KR | 10-1729702 B1 | 4/2017 |
| KR | 10-1765459 B1 | 8/2017 |
| KR | 10-1795544 B1 | 11/2017 |
| KR | 10-2019-0040554 A | 4/2019 |
| WO | WO 2005/052053 A1 | 6/2005 |
| WO | WO 2005/096089 A1 | 10/2005 |
| WO | WO 2012/156297 A2 | 11/2012 |
| WO | WO 2013/052704 A1 | 4/2013 |
| WO | WO 2014/102131 A2 | 7/2014 |
| WO | WO 2014/153465 A1 | 9/2014 |
| WO | WO 2015/100762 A1 | 7/2015 |
| WO | WO 2016/031335 A1 | 3/2016 |
| WO | WO 2016/178210 A1 | 11/2016 |
| WO | WO 2017/052248 A1 | 3/2017 |
| WO | WO 2017/083566 A1 | 5/2017 |
| WO | WO 2017/120391 A1 | 7/2017 |
| WO | WO 2017/131451 A1 | 8/2017 |
| WO | WO 2018/110933 A1 | 6/2018 |
| WO | WO 2018/194414 A1 | 10/2018 |

(56) References Cited

FOREIGN PATENT DOCUMENTS

WO  WO 2018/194415 A1  10/2018
WO  WO 2019/027147 A1  2/2019

OTHER PUBLICATIONS

Ying Shi et al., "Graphene-based integrated electrodes for flexible lithium ion batteries", 2D Materials 2 (2015): 024004. (Year: 2015), (9 Pages Total).
A. Weidenkaff et al. "Metal Nanoparticles for the Production of Carbon Nanotube Composite Materials by Decomposition of Different Carbon Sources" Materials Science and Engineering C, vol. 19, pp. 119-123, 2002.
A. J. Clancy et al., "A One-Step Route to Solubilised, Purified or Functionalised Single-Walled Carbon Nanotunes", Journal of Materials Chemistry A, pp. 16708-16715, 2015.
Beate Krause et al., "Disperability and Particle Size Distribution of CNTs in an Aqeous Surfactant Dispersion as a Function of Ultrasonic Treatment Time" Carbon 48, pp. 2746-2754, 2010.
Chee Howe See et al., "CaCO3 Supported Co—Fe Catalysts for Carbon Nanotube Synthesis in Fluidized Bed Reactors" Particle Technology and Fluidization, vol. 54, No. 3, pp. 657-664, Mar. 2008.
Communication dated Jul. 31, 2019, from the European Patent Office in related European Application No. 18194454.7.
Danafar, F. et. al., "Fluidized bed catalytic chemical vapor deposition synthesis of carbon nanotubes—A review," The Chemical Engineering Journal, vol. 155, pp. 37-48, 2009.
Dunens, O., et al., "Synthesis of Multiwalled Carbon Nanotubes on Fly Ash Derived Catalysts," Environ. Sci. Technol., vol. 43, pp. 7889-7894, 2009.
Extended European Search Report issued in related European Application No. 18184002.6 dated Nov. 30, 2018.
Extended European Search Report issued in related European Patent Application No. 18194469.5 dated Dec. 4, 2018.
Hasegawa Kei et. al., "Lithium Ion Batteries Made of Electrodes with 99 wt% active materials and 1wt% carbon nanotubes without binder or metal foils", Journal of Power Sources, vol. 321, pp. 155-162, 2016.
Howard Wang, "Dispersing Carbon Nanotubes Usuing Surfactants" Current Opinion in Colloid & Interface Science 14, pp. 364-371, 2009.
Hu, Liangbing et al., Thin, Flexible Secondary Li-Ion Paper Batteries, ACS Nano, vol. 4, No. 10, pp. 5843-5848, 2010.
International Search Report and Written Opinion, issued by International Searching Authority in related International Application No. PCT/US19/49923, dated Jan. 23, 2020.
Jenax Inc., Flexible Lithium Polymer Battery J . FLEX, Copyright 2014, (6 Pages Total).
Joo-Seong Kim et al., Supporting Information, A Half Millimeter Thick Coplanar Flexible Battery with Wireless Recharging Capability, Nano Letters 2015 15 (4), 9 Pages Total, (2015).
Kim et al., "A Half Millimeter Thick Coplanar Flexible Battery with Wireless Recharging Capability", Nano Letters, American Chemical Society, 2015, (9 Pages Total).
Kun Kelvin Fu et al., "Flexible Batteries: From Mechanics to Devices", 2016 American Chemical Society, ACS Publications, ACS Energy Letters 1, pp. 1065-1079, (2016).
Linqin Jiang et al., "Production of Aqueous Colloidal Dispersions of Carbon Nanotubes", Journal of Colloid and Interface Science, pp. 89-94, 2003.
Luo Shu et al., "Binder-Free LiCoO2/Carbon Nanotube Cathodes for High-Performance Lithium Ion Batteries" Advanced Materials, vol. 24, pp. 2294-2298, 2012.
Nanalyze., A Flexible Battery from Blue Spark Technologies, Apr. 8, 2014, (4 Pages Total).
Panasonic Corp., Panasonic Develops Bendable, Twistable, Flexible Lithium-ion Battery, Sep. 29, 2016, (8 Pages Total).
ProLogium Technology Co., Ltd., FLCB Flexible Type LCB, Copyright 2015, (6 Pages Total).
Pu et al., "A Self-Charging Power Unit by Integration of a Textile Triboelectric Nanogenerator and a Flexible Lithium-Ion Battery for Wearable Electronics", Advanced Materials. 2015, (2015), (7 Pages Total).
Sarah Maghsoodi et al., "A Novel Continuous Process for Synthesis of Carbon Nanotubes Using Iron Floating Catalyst and MgO Particles for CVD of methane in a fluidized bed reactor" Applied Surface Science, vol. 256, pp. 2769-2774, 2010.
Sau Yen Chew et al., "Flexible free-standing carbon nanotube films for model lithium-ion batteries", Carbon 47, pp. 2976-2983, (2009).
Sebastian Anthony, LG produces the first flexible cable-type lithium-ion battery, ExtremeTech, Aug. 30, 2012, (9 Pages Total).
Sheng Xu et al., "Stretchable batteries with self-similar serpentine interconnects and integrated wireless recharging systems," Nature communications 4:1543, DOI: 10.1038/ncomms2553, 8 Pages Total, (2013).
Shu Luo et al., "Binder-Free LiCoO2/ Carbon Nanotube Cathodes for High-Performance Lithium Ion Batteries", Advanced Materials 24, pp. 2294-2298, (2012).
The Extended European Search Report issued in related European Patent Application No. 18186402.6 dated Oct. 11, 2018.
The Swatch Group Ltd., A revolutionary battery by Belenos: The Watchmaker Swatch Group Has Signed an Agreement With the Chinese Geely Group for Use of its Innovative New Battery., as accessed on May 29, 2019, (3 Pages Total), https://www.swatchgroup.com/en/ swatch-group/innovation-powerhouse/industry-40/revolutionarv-battery-belenos.
Vishwam Sankaran., Samsung is reportedly developing a curved battery for its foldable phone, Jul. 4, 2018, (4 Pages Total).
Wang Ke et al., "Super-Aligned Carbon Nanotube Films as Current Collectors for Lightweight and Flexible Lithium Ion Batteries" Advanced Functional Materials, vol. 23, pp. 846-853, 2013.
Xian-Ming Liu et al., "Carbon nanotube (CNT)-based composites as electrode material for rechargeable Li-ion batteries: A review", Composite Science and Technology, vol. 72, pp. 121-144, (2012).
Zhao, M.Q et. al., "Towards high purity graphene/single-walled carbon nanotube hybrids with improved electrochemical capacitive performance," Carbon, vol. 54, pp. 403-411, 2013.
Zhiqian Wang et al., "Fabrication of High-Performance Flexible Alkaline Batteries by Implementing Multiwalled Carbon Nanotubes and Copolymer Separator" Advanced Materials 26, pp. 970-976, (2014).
Zhiqiang Niu et al., "A"skeleton/skin" strategy for preparing ultrathin free-standing single-walled carbon nanotube/polyaniline films for high performance supercapacitor electrodes", The Royal Society of Chemistry 2012, Energy & Environmental Science 5, pp. 8726-8733, (2012).
Communication dated Aug. 26, 2019, from the European Patent Office in related European Application No. 18186402.6.
Communication dated Dec. 1, 2020, from the Japanese Patent Office in counterpart application No. 2017-048275.
Communication dated Dec. 1, 2020, from the Japanese Patent Office in counterpart application No. 2017-048276.
Communication dated Dec. 22, 2020, from the Japanese Patent Office in related application No. 2020-002026.
Communication dated Feb. 4, 2020, from the European Patent Office in related European Application No. 18 173 644.8.
Communication dated Jan. 6, 2021, from the Japanese Patent Office in related application No. 2020-002545.
Communication issued by International Searching Authority in related International Application No. PCT/US19/49923, dated Nov. 13, 2019 (PCT/ISA/206).
David Schiller, "Development of a Stretchable Battery Pack for Wearable Applications", submitted by David Schiller, BSc., Johannes Kepler University Linz, Diss. Universit't Linz, Nov. 2019, 28 Pages Total, https://epub.jku.at/obvulihs/content/titleinfo/4605900/full.pdf.
Extended European Search Report issued in related European Patent Application No. 18173644.8 dated Oct. 12, 2018.
Extended Search Report of related EP Application No. 18 19 4454 dated Jul. 23, 2019.

(56) References Cited

OTHER PUBLICATIONS

Xiong Pu et al., "A Self-Charging Power Unit by Integration of a Textile Triboelectric Nanogenerator and a Flexible Lithium-Ion Battery for Wearable Electronics", Advanced Materials 27, pp. 2472 2478, (2015).
International Search Report and Written Opinion, issued by International Searching Authority in related International Application No. PCT/US2020/020993, dated Jul. 2, 2020.
International Search Report and Written Opinion, issued by International Searching Authority in related International Application No. PCT/US2020/039821, dated Sep. 30, 2020.
International Search Report and Written Opinion, issued by International Searching Authority in related International Application No. PCT/US2020/043017, dated Dec. 14, 2020.
O.M. Marago, et al, "Optical trapping of carbon nanotubes", Physica E, 40 (2008), pp. 2347-2351.
Office Action issued by the European Patent Office in related European Patent Application No. 18184002.6, dated May 13, 2020.
Fenghua Su et al., "High-Performance Two-Ply Yarn Supercapacitors Based on Carbon Nanotube Yarns Dotted with CO3O4 and NiO Nanoparticles", Small 2015; 11, No. 7, pp. 854-861 with Supporting Information(12 Pages Total), www.small-journal.com, (Year: 2015).
Aminy E. Ostfeld et al., "High-performance flexible energy storage and harvesting system for wearable electronics", www.nature.com/scientificreports, Scientific Reports, 6:26122,DOI:10.1038/srep26122, (2016), (10 Pages Total).
Communication dated Jul. 27, 2021, issued by the Korean Intellectual Property Office in related Korean Application No. 10-2020-0005929.
Sungmook Jung et al., "Wearable Fall Detector using Integrated Sensors and Energy Devices", www.nature.com/scientificreports, Scientific Reports, 5:17081, DOI: 10.1038/srep17081, (2015), (9 Pages Total).
Communication dated Nov. 9, 2021, from the Japanese Patent Office in related application No. 2018-172178.
Notice of Reasons for Rejection dated Aug. 17, 2021, from the Japanese Patent Office in related application No. 2020-002545.
Notification of the First Office Action dated Jul. 16, 2021, from the State Intellectual Property Office of People's Republic of China in related Application No. 201710151455.7.
Communication dated Jan. 27, 2022, from the State Intellectual Property Office of People's Republic of China in related Application No. 201710150360.3.
Communication dated Mar. 22, 2022, from the State Intellectual Property Office of People's Republic of China in Application No. 201811076414.7.
Communication dated Feb. 23, 2022, from the State Intellectual Property Office of People's Republic of China in Application No. 202010079226.0.
Communication dated Sep. 26, 2021, issued by the Korean Intellectual Property Office in related Korean Application No. 10-2018-0058433.
Communication dated May 6, 2022, from the State Intellectual Property Office of People's Republic of China in Chinese Application No. 201710150360.3.
Shan Jiang et al., "Series in Science Communication by Chinese Academy of Sciences: Nanometer", Popular Science Press, pp. 155-157, Sep. 2013.
Yurong Liu, "Applications of Carbon Materials in Supercapacitor", National Defense Industry Press, (p. 142, 2 pages total), Jan. 2013.
Office Action dated Jun. 28, 2022, issued by the Korean Patent Office in Korean Application No. 10-2022-0057879.

* cited by examiner

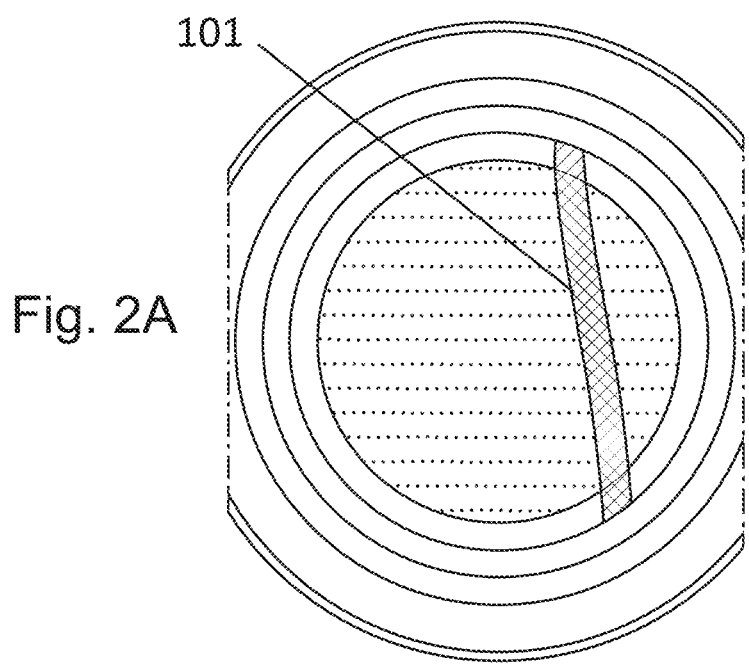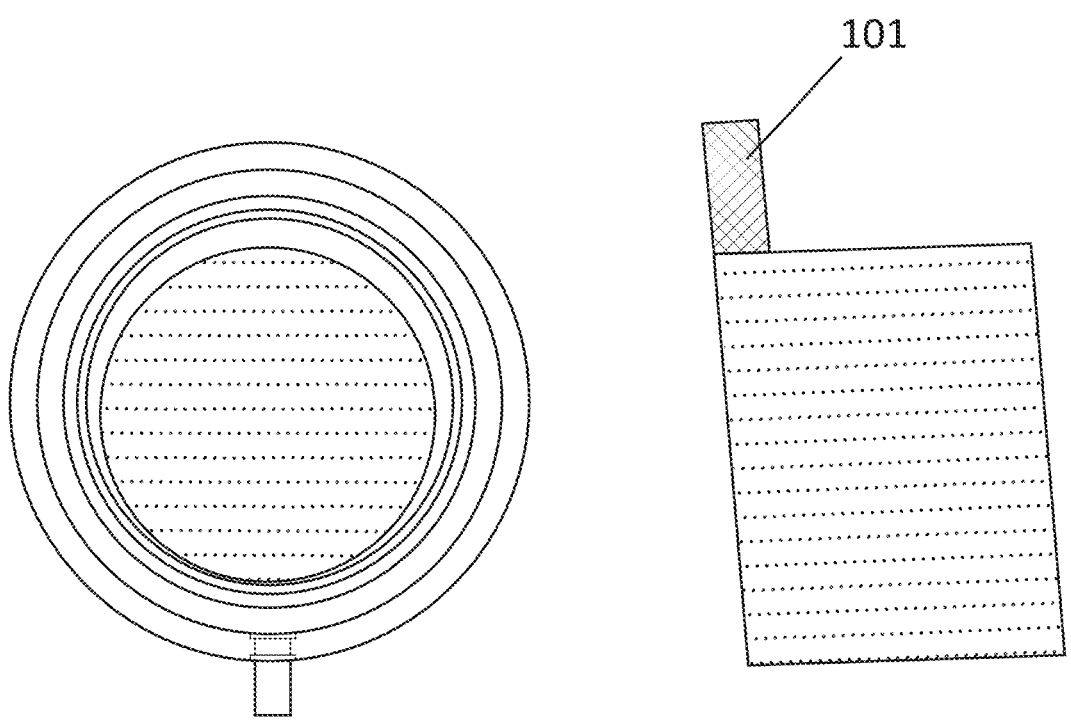

METHOD FOR EMBEDDING A BATTERY TAB ATTACHMENT IN A SELF-STANDING ELECTRODE WITHOUT CURRENT COLLECTOR OR BINDER

CROSS-REFERENCE TO RELATED APPLICATIONS

This application is a divisional of U.S. patent application Ser. No. 16/123,872, entitled "Method for Embedding a Battery Tab Attachment in a Self-Standing Electrode Without Current Collector or Binder," filed Sep. 6, 2018, which claims priority to U.S. Patent Application No. 62/559,254, entitled "Method and Structure for Battery Tab Attachment to a Self-Standing Electrode Without Current Collector or Binder," filed Sep. 15, 2017, the entirety of both applications being incorporated herein by reference.

BACKGROUND

A Li-ion battery consists of two electrodes (anode and cathode), a membrane separating anode from cathode, and electrolyte. Electrodes consist of an active material, a binder, a carbon-based additive and current collectors. Aluminum/Copper foils are typical current collectors for Li-ion batteries. Usually, the active material is printed on the surface of the current collectors using a slurry consisting of the active material, the additive, a binder, and a proper solvent. After preparation of the electrode, an electrically conductive tab is attached to the current collector to get the current out of the battery. Commonly, the tab is a strip of aluminum/copper foil, which is welded to the current collector foil of the electrodes.

In the case of self-standing electrodes, comprising only the active material powder and carbon nanotube matrix, and in which no collector foil is present, a method is needed for transporting the current from the electrodes. In other words, it is necessary to solve the problem of tab attachment to the electrode, which does not have any current collector foils.

SUMMARY

The following presents a simplified summary of one or more aspects of the present disclosure in order to provide a basic understanding of such aspects. This summary is not an extensive overview of all contemplated aspects and is intended to neither identify key or critical elements of all aspects nor delineate the scope of any or all aspects. Its purpose is to present some concepts of one or more aspects in a simplified form as a prelude to the more detailed description that is presented later.

In some embodiments, the present disclosure is directed to a self-standing electrode comprising: a composite of an electrode active material, and carbon nanotubes; and a battery tab attachment structure embedded in the composite, wherein the electrode has an overall length, an overall width, and an overall thickness, and the battery tab attachment structure has a width that is about 1% to about 100% of the overall width of the electrode.

In some embodiments, the present disclosure is directed to a method of making a binderless, collectorless self-standing electrode, the method comprising: aerosolizing or fluidizing an electrode active material to produce an aerosolized or fluidized electrode active material; and co-depositing the aerosolized or fluidized electrode active material and carbon nanotubes onto a first porous surface, and a battery tab attachment structure spaced above the first porous surface to form a self-standing electrode material that is a composite of the electrode active material in a three-dimensional network of carbon nanotubes with the battery tab attachment structure embedded within the self-standing electrode material, wherein the electrode has an overall length, an overall width, and an overall thickness, and the battery tab attachment structure has a width that is about 1% to about 100% of the overall width of the electrode.

These and other aspects of the invention will become more fully understood upon a review of the detailed description, which follows.

BRIEF DESCRIPTION OF THE DRAWINGS

FIGS. 2A-2C show examples of images of tab attachment according to the aspects depicted in FIGS. 1A-1D.

DETAILED DESCRIPTION

Figure 1A:
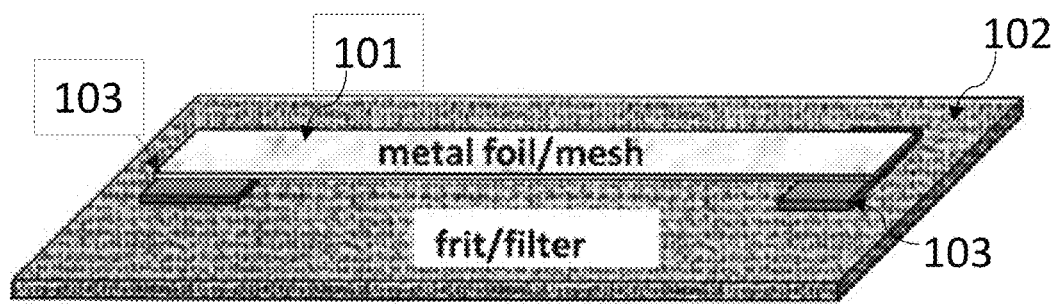
FIGS. 1A-1D show a schematic of a method for battery tab attachment to a self-standing electrode according to some aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details.

The present disclosure provides self-standing electrodes comprising a composite of carbon nanotubes and electrode active materials, with a battery tab attachment structure embedded in the composite, and methods of making the same.

In some embodiments, the present disclosure is directed to a self-standing electrode comprising: a composite of an electrode active material, and carbon nanotubes; and a battery tab attachment structure embedded in the composite, wherein the electrode has an overall length, an overall width, and an overall thickness, and the battery tab attachment structure has a width that is about 1% to about 100% of the overall width of the electrode. In some aspects, the battery tab attachment structure width is about 10% to about 75% of the overall width of the electrode.

As used herein, "electrode active material" refers to the conductive material in an electrode. The term "electrode" refers to an electrical conductor where ions and electrons are exchanged with an electrolyte and an outer circuit. "Positive electrode" and "cathode" are used synonymously in the present description and refer to the electrode having the higher electrode potential in an electrochemical cell (i.e., higher than the negative electrode). "Negative electrode" and "anode" are used synonymously in the present description and refer to the electrode having the lower electrode potential in an electrochemical cell (i.e., lower than the positive electrode). Cathodic reduction refers to gain of electron(s) of a chemical species, and anodic oxidation refers to the loss of electron(s) of a chemical species.

In a non-limiting example, the electrode active material may be any solid, metal oxide powder that is capable of being aerosolized. In an illustrative example, the metal oxide is a material for use in the cathode of the battery. Non-limiting examples of metal oxides include oxides of Ni, Mn, Co, Al, Mg, Ti, and any mixture thereof. The metal oxide may be lithiated. In an illustrative example, the metal oxide is lithium nickel manganese cobalt oxide (LiNiMnCoO2). The metal oxide powders can have a particle size defined within a range between about 1 nanometer and about 100 microns. In a non-limiting example, the metal oxide particles have an average particle size of about 1 nm to about 10 nm. In some aspects, the electrode active material is selected from graphite, hard carbon, silicon, silicon oxides, lithium metal oxides, lithium iron phosphate, and lithium metal.

Metals in lithium metal oxides according to the present disclosure may include but are not limited to one or more alkali metals, alkaline earth metals, transition metals, aluminum, or post-transition metals, and hydrates thereof.

"Alkali metals" are metals in Group I of the periodic table of the elements, such as lithium, sodium, potassium, rubidium, cesium, or francium.

"Alkaline earth metals" are metals in Group II of the periodic table of the elements, such as beryllium, magnesium, calcium, strontium, barium, or radium.

"Transition metals" are metals in the d-block of the periodic table of the elements, including the lanthanide and actinide series. Transition metals include, but are not limited to, scandium, titanium, vanadium, chromium, manganese, iron, cobalt, nickel, copper, zinc, yttrium, zirconium, niobium, molybdenum, technetium, ruthenium, rhodium, palladium, silver, cadmium, lanthanum, cerium, praseodymium, neodymium, promethium, samarium, europium, gadolinium, terbium, dysprosium, holmium, erbium, thulium, ytterbium, lutetium, hafnium, tantalum, tungsten, rhenium, osmium, iridium, platinum, gold, mercury, actinium, thorium, protactinium, uranium, neptunium, plutonium, americium, curium, berkelium, californium, einsteinium, fermium, mendelevium, nobelium, and lawrencium.

"Post-transition metals" include, but are not limited to, gallium, indium, tin, thallium, lead, bismuth, or polonium.

As used herein, suitable composites of "an electrode active material and single-walled carbon nanotubes" include, but are not limited to, self-standing electrodes such as those disclosed in U.S. patent application Ser. No. 15/665,171, entitled "Self Standing Electrodes and Methods for Making Thereof," filed Jul. 31, 2017, and U.S. patent application Ser. No. 15/665,142, entitled "Continuous Production of Binder and Collector-Less Self-Standing Electrodes for Li-Ion Batteries by Using Carbon Nanotubes as an Additive," filed Jul. 31, 2017. Each of these applications is hereby incorporated by reference herein in its entirety. In some aspects, the electrode active material is selected from graphite, hard carbon, lithium metal oxides, and lithium iron phosphate.

In some aspects, the battery tab attachment structure comprises a metal. In some aspects, the metal is copper, aluminum, nickel, or stainless steel. In a non-limiting example, the stainless steel may be any stainless steel known in the art, including, but not limited to, SS304 and SS316. In some aspects, the battery tab attachment structure comprises a conductive carbon structure. The conductive carbon structure may comprise carbon nanotubes, graphene, (such as two- and three-dimensional graphene forms, such as graphene foams), carbon fibers, graphite, or any other conductive allotropic form of carbon, or a combination thereof, or a composite thereof. The carbon nanotubes may be single-, few-, or multi-walled carbon nanotubes, or a combination thereof, with single-walled carbon nanotubes being preferred. When carbon nanotubes and/or carbon fibers are used, the carbon nanotubes and/or carbon fibers may be in the form of nanotube yarn, nanotube threads, nanotube cloth, nanotube wires, nanotube paper (i.e., buckypaper), nanotube mats, nanotube sheets, or nanotube felt. The battery tab attachment structure may be in any solid physical form, including but not limited to, foil, strips, wire, grid, ropes, mesh foil, perforated foil, cloth, gauze, or mesh. The battery tab attachment structure may be embedded in the composite by a process of co-depositing aerosolized or fluidized electrode active material and single-walled carbon nanotubes onto a first porous surface with the battery tab attachment structure spaced above it. The aerosolized or fluidized electrode active material and single-walled carbon nanotubes may be present in a mixture together or may not contact each other prior to the co-depositing or co-deposition. Suitable co-depositing methods and apparatuses may be known in the art and include, but are not limited to, those described in U.S. patent application Ser. No. 15/665,171, entitled "Self Standing Electrodes and Methods for Making Thereof," filed Jul. 31, 2017, and U.S. patent application Ser. No. 15/665,142, entitled "Continuous Production of Binder and Collector-Less Self-Standing Electrodes for Li-Ion Batteries by Using Carbon Nanotubes as an Additive," filed Jul. 31, 2017. Each of these applications is hereby incorporated by reference herein in its entirety.

The self-standing electrode of the present disclosure may be characterized by an overall length, an overall width, and an overall thickness, including both the composite and the battery tab attachment structure embedded therein. In some aspects, the overall thickness of the electrode is from about 10 µm to about 5000 µm, such as from about 20 µm to about 300 µm, or any integer or subrange in between. In some aspects, the electrode has an overall thickness of about 20 µm to about 100 µm. In some aspects, the electrode has an overall thickness of about 20 µm to about 75 µm. the electrode has an overall thickness of about 20 µm to about 50 µm. the electrode has an overall thickness of about 20 µm to about 40 µm.

According to the present disclosure, the battery tab attachment structure has a width that is about 10% to about 75% of the overall width of the electrode. In some aspects, the battery tab attachment structure has a width that is about 10% to about 50% of the overall width of the electrode. In some aspects, the battery tab attachment structure has a width that is about 10% to about 30% of the overall width of the electrode. In some aspects, the battery tab attachment structure has a width that is about 3% to about 10% of the overall width of the electrode.

In other embodiments, the present disclosure is directed to a method of making a binderless, collectorless self-standing electrode, the method comprising:
aerosolizing or fluidizing an electrode active material to produce an aerosolized or fluidized electrode active material; and co-depositing the aerosolized or fluidized electrode active material and carbon nanotubes onto a first porous surface, and a battery tab attachment structure spaced above the first porous surface to form a self-standing electrode material that is a composite of the electrode active material in a three-dimensional network of carbon nanotubes with the battery tab attachment structure embedded within the self-standing electrode material, wherein the electrode has an overall length, an overall width, and an overall thickness, and the battery tab attachment structure has a width that is about 1% to about 100% of the overall width of the electrode. All aspects described with respect to the self-standing electrode apply with equal force to the method of making the binderless, collectorless self-standing electrode, and vice versa. The carbon nanotubes may be single-walled, few-walled, or multi-walled, or a combination thereof.

In some aspects, the co-depositing the aerosolized or fluidized electrode active material and carbon nanotubes onto the first porous surface and the battery tab attachment structure spaced above the first porous surface comprises simultaneously contacting with the first porous surface and the battery tab attachment structure spaced above the first porous surface the aerosolized or fluidized electrode active material and the carbon nanotubes, wherein the aerosolized or fluidized electrode active material and the carbon nanotubes were not previously in contact with one another. Suitable methods and apparatuses for production of carbon nanotubes and aerosolization or fluidization of electrode active materials for simultaneous deposition, wherein the aerosolized or fluidized electrode active material and the single-walled carbon nanotubes do not contact each other prior to their simultaneous deposition, include those known to persons of ordinary skill in the art, including, but not limited to, those described in U.S. patent application Ser. No. 15/665,142, entitled "Continuous Production of Binder and Collector-Less Self-Standing Electrodes for Li-Ion Batteries by Using Carbon Nanotubes as an Additive," filed Jul. 31, 2017, which is hereby incorporated herein by reference in its entirety.

In some aspects, the co-depositing the aerosolized or fluidized active material and carbon nanotubes onto the first porous surface and the battery tab attachment structure spaced above the first porous surface comprises contacting the aerosolized electrode active material powder with the carbon nanotubes in a carrier gas to form a mixture of the carbon nanotubes and the aerosolized electrode active material powder; collecting the mixture on the first porous surface and the battery tab attachment structure spaced above the first porous surface; and removing the carrier gas. Suitable methods and apparatuses for contacting the aerosolized electrode active material powder with the carbon nanotubes in a carrier gas to form a mixture of the single-walled carbon nanotubes and the aerosolized electrode active material powder, suitable porous surfaces, and suitable methods and apparatuses for removing carrier gases are known to those of ordinary skill in the art and include, but are not limited to, those disclosed in U.S. patent application Ser. No. 15/665,171, entitled "Self Standing Electrodes and Methods for Making Thereof," filed Jul. 31, 2017, which is hereby incorporated herein by reference in its entirety.

FIGS. 1A-1D show a schematic of a method for battery tab attachment to a self-standing electrode according to some aspects of the present disclosure. The battery tab attachment structure 101 may be spaced above the first porous surface using any suitable means as may be known to those of ordinary skill in the art, including, but not limited to, positioning one or more spacers 103 onto the first porous surface 102 and positioning the battery tab attachment structure 101 onto the one or more spacers 103. Preferably, the one or more spacers 103 are positioned on the porous surface 102, and the battery tab attachment structure 101 is positioned on the one or more spacers 103, so as to leave a vertical gap h between the battery tab attachment structure 101 and the first porous surface 102 for a portion of the length of the battery tab attachment structure 101, so that the aerosolized electrode active material and the carbon nanotubes may co-deposit above and below the battery tab attachment structure 101, i.e., both above the battery tab attachment structure 101 and above the first porous surface 102 but below the battery tab attachment structure 101. The vertical gap h may be of any size relative to the battery tab attachment structure 101 thickness. The battery tab attachment structure 101 may be of any thickness, such as about 5 μm to about 2000 μm, such as about 10 μm to about 290 μm, such as about 100 μm or about 15 μm, or any other integer or subrange in between. Tab attachment structure width and thickness depend on the electrode size and the weight of the active material in it, and, therefore, the current the tab needs to carry. Based on the conductance of tab attachment structure and tab materials, and the current it needs to carry, the minimal tab attachment structure geometry (especially its cross-section area) can be calculated. The battery tab attachment structure may be embedded within the composite at any depth. In some aspects, it is embedded at a depth that is halfway through the overall thickness of the self-standing electrode.

In some aspects, two spacers 103 may be used. Suitable spacer materials include, but are not limited to, paper, cellulose, and polymeric materials. The one or more spacers 103 may be of any dimensions and shape relative to the porous surface 102 and/or the battery tab attachment structure 101, but preferably the one or more spacers 103 are wider than the battery tab attachment structure, so as to facilitate removal of the self-standing electrode material after the co-depositing.

The co-depositing may occur over any duration of time. Without wishing to be bound by any particular theory, the overall thickness of the self-standing electrode may be determined by one or more factors including but not limited to the duration of time of co-depositing, the flow rate of the aerosolized or fluidized electrode active material and/or the single walled carbon nanotubes, the concentrations of the aerosolized or fluidized electrode active material and/or the single walled carbon nanotubes, the thickness of the battery tab attachment structure, and the size of the vertical gap h. In some aspects, about 20 minutes of co-depositing may result in a self-standing electrode with an overall thickness of about 30 μm. In some aspects, about 2 hours of co-depositing may result in a self-standing electrode with an overall thickness of about 100 μm. Those of ordinary skill in the art will be able to vary those factors to obtain self-standing electrodes of desired thickness and/or other properties, such as electric chare or energy charge. For example, flow rate and/or concentrations of the aerosolized or fluidized electrode active material and/or the single walled carbon nanotubes may be varied using the methods and apparatuses disclosed in U.S. patent application Ser. No. 15/665,171, entitled "Self Standing Electrodes and Methods for Making Thereof," filed Jul. 31, 2017, and U.S. patent application Ser. No. 15/665,142, entitled "Continuous Production of Binder and Collector-Less Self-Standing Electrodes for Li-Ion Batteries by Using Carbon Nanotubes as an Additive," filed Jul. 31, 2017. Each of these applications is hereby incorporated by reference herein in its entirety.

In addition, the overall thickness of the self-standing electrode may be modified by pressing, which may reduce the overall thickness by as much as half. For example, a self-standing electrode with an overall thickness of 100 μm may be pressed to a thickness of 50 μm. Pressing may also modify the density of the composite and/or the battery tab attachment structure. Suitable methods and apparatuses for pressing electrodes are known in the art and include but are not limited to those disclosed in U.S. patent application Ser. No. 15/665,171, entitled "Self Standing Electrodes and Methods for Making Thereof," filed Jul. 31, 2017, and U.S. patent application Ser. No. 15/665,142, entitled "Continuous Production of Binder and Collector-Less Self-Standing Electrodes for Li-Ion Batteries by Using Carbon Nanotubes as an Additive," filed Jul. 31, 2017. Each of these applications is hereby incorporated by reference herein in its entirety.

EXAMPLE

Figure 1B:
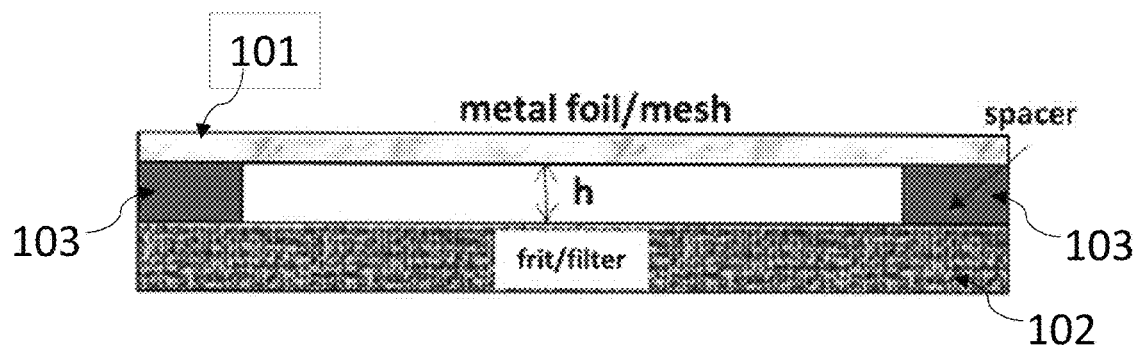
Figure 1C:
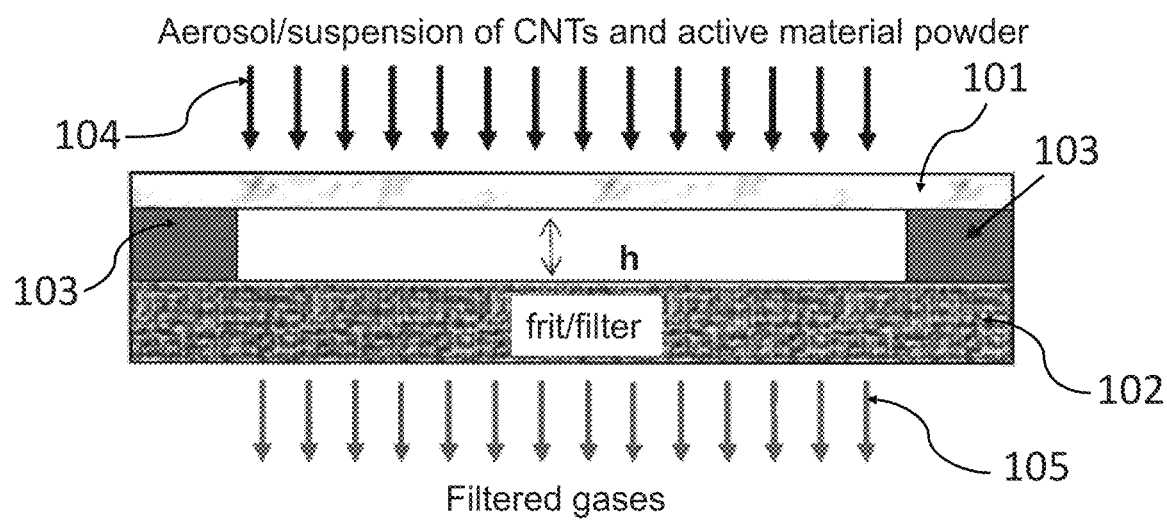
Figure 1D:
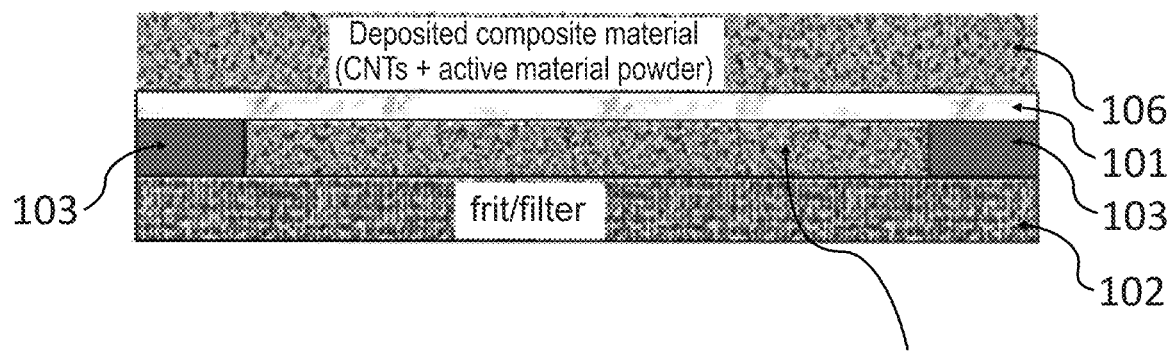

A narrow and thin conductive strip/wire/grid is embedded into a self-standing electrode during its formation (FIGS. 1A-1D). For this purpose, metal piece 101, which may be thin aluminum or copper strips, wire, or mesh, was spaced a distance h above a frit or mesh 102 (using spacers 103) that serves as a substrate/filter for simultaneous deposition of a mixture of an electrode active material powder and a carbon nanotube additive (FIGS. 1A-B). In a non-limiting example, the carbon nanotube additive may comprise single-walled carbon nanotubes, multi-walled carbon nanotubes, and mixtures thereof. The dimensions of the strip or wire 101 can be very small compared to the electrode size. During the deposition of the mixture 104 to form an electrode film, the electrode active material and the carbon nanotube additive grows around, below, above, and/or on the metal strips, wire, or mesh 101, encapsulating these metal structure(s) 101 inside the mixture of the electrode active material and the carbon nanotube additive (FIGS. 1C-D). Frit 102 also serves as a filter to filter gases in direction 105. Then, the electrode film 106 with the metal structures 101 inside it is pressed to the desired density using a roller mill or another method, thus resulting in a self-standing composite electrode with the metal structure embedded in it. The metal structure 101 (foil, strip, wire, mesh, grid, etc.) can protrude outside of the electrode 106, providing an electric tab attachment spot. The tab can be attached by welding or by another method. As a variant of this method, the embedded conductive structure can be a metal mesh or a conductive permeable membrane (e.g., made of conductive polymers), which itself serves as a substrate/filter for electrode formation/deposition. This can be used either for electrode growth from gas phase (e.g., aerosol), or for deposition from a liquid phase (e.g., from a mixture or suspension). Then, the conductive substrate/filter is embedded into the material by a pressing procedure, as described above. FIG. 2a shows an example of an aluminum mesh 101 on the frit. FIG. 2b shows the example of FIG. 2a upon deposition of the mixture of the carbon nanotube (CNT) and the electrode active material. FIG. 2c shows an example of an aluminum mesh 101 embedded in a self-standing electrode.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. Aspects from the various embodiments described, as well as other known equivalents for each such aspect, can be mixed and matched by one of ordinary skill in the art to construct additional embodiments and techniques in accordance with principles of this application.

The invention claimed is:

1. A method of making a self-standing electrode, the method comprising:
providing a battery tab attachment structure spaced apart from a first porous surface; and
co-depositing an aerosolized or fluidized electrode active material and carbon nanotubes onto the first porous surface to form the self-standing electrode comprising a composite of the electrode active material and the carbon nanotubes with at least a portion of the battery tab attachment structure embedded therein.

2. The method of claim 1, wherein the self-standing electrode has an overall length, an overall width, and an overall thickness, and the battery tab attachment structure has a width that is about 1% to about 100% of the overall width of the self-standing electrode.

3. The method of claim 1, wherein the self-standing electrode has an overall length, an overall width, and an overall thickness, and the battery tab attachment structure has a width that is about 1% to about 50% of the overall width of the self-standing electrode.

4. The method of claim 1, wherein the self-standing electrode has an overall length, an overall width, and an overall thickness, and the battery tab attachment structure has a width that is about 10% to about 50% of the overall width of the self-standing electrode.

5. The method of claim 1, wherein the self-standing electrode has an overall length, an overall width, and an overall thickness, and the battery tab attachment structure has a width that is about 10% to about 30% of the overall width of the self-standing electrode.

6. The method of claim 1, wherein the self-standing electrode has an overall length, an overall width, and an overall thickness, and the battery tab attachment structure has a width that is about 10% to about 20% of the overall width of the self-standing electrode.

7. The method of claim 1, wherein the electrode active material is selected from the group consisting of graphite, hard carbon, silicon, silicon oxides, lithium metal oxides, lithium iron phosphate, lithium metal, and combinations thereof.

8. The method of claim 1, wherein the battery tab attachment structure comprises a metal.

9. The method of claim 8, wherein the metal comprises copper, aluminum, nickel, stainless steel, or a combination thereof.

10. The method of claim 1, wherein the self-standing electrode has a thickness of about 10 µm to about 5000 µm.

11. The method of claim 1, wherein the self-standing electrode has a thickness of about 20 µm to about 100 µm.

12. The method of claim 1, wherein the self-standing electrode is binderless and collectorless.

13. The method of claim 1, wherein the composite comprises the electrode active material in a three-dimensional network of the carbon nanotubes.

14. The method of claim 1, wherein co-depositing the aerosolized or fluidized electrode active material and the carbon nanotubes comprises:
contacting the aerosolized or fluidized electrode active material with the carbon nanotubes in a carrier gas to form a mixture of the carbon nanotubes and the aerosolized or fluidized electrode active material;
collecting the mixture on the first porous surface and on the battery tab attachment structure; and
removing the carrier gas.

15. The method of claim 1, wherein the battery tab attachment structure has a first surface and a second surface opposite the first surface, and
wherein at least a portion of each of the first surface and the second surface are in contact with the self-standing electrode material in the self-standing electrode.

16. The method of claim 1, wherein the battery tab attachment structure comprises a conductive carbon structure.

17. The method of claim 16, wherein the conductive carbon structure comprises carbon nanotubes, graphene, carbon fibers, graphite, any other conductive allotropic form of carbon, or a combination thereof, or a composite of thereof.

18. A method of making a self-standing electrode comprising:
aerosolizing or fluidizing an electrode active material to produce an aerosolized or fluidized electrode active material;
co-depositing the aerosolized or fluidized electrode active material and carbon nanotubes onto a first porous surface to form the self-standing electrode, the self-standing electrode comprising a self-standing electrode material with a battery tab attachment structure embedded within; and
removing the self-standing electrode from the first porous surface,
wherein the self-standing electrode material comprises a composite of the electrode active material and the carbon nanotubes.

19. The method of claim 18, wherein the self-standing electrode is binderless and collectorless.

20. The method of claim 18, wherein the composite comprises the electrode active material in a three-dimensional network of the carbon nanotubes.

* * * * *

UNITED STATES PATENT AND TRADEMARK OFFICE
CERTIFICATE OF CORRECTION

| | |
|---|---|
| PATENT NO. | : 11,489,147 B2 |
| APPLICATION NO. | : 17/314807 |
| DATED | : November 1, 2022 |
| INVENTOR(S) | : Avetik Harutyunyan et al. |

It is certified that error appears in the above-identified patent and that said Letters Patent is hereby corrected as shown below:

On the Title Page

Items (62) and (60) Related U.S. Application Data delete in their entirety and substitute therefore the following:
-- (62) Related U.S. Application Data
Division of application No. 16/123,872, filed on Sep. 6, 2018, now Pat. No. 11,121,358, which claims benefit of provisional application No. 62/559,254, filed on Sep. 15, 2017 --.

Signed and Sealed this
Second Day of July, 2024

Katherine Kelly Vidal
*Director of the United States Patent and Trademark Office*